United States Patent
Harrington Legge et al.

(10) Patent No.: US 11,310,307 B2
(45) Date of Patent: *Apr. 19, 2022

(54) COMPUTER-BASED PLATFORMS/SYSTEMS, COMPUTING DEVICES/COMPONENTS AND/OR COMPUTING METHODS FOR ONE OR MORE TECHNOLOGICAL APPLICATIONS INVOLVING REAL-TIME DATA PROCESSING BETWEEN A SERVER, ONE OR MORE MOBILE COMPUTING DEVICES AND NEAR FIELD COMMUNICATION CONNECTED INTERACTIVE POSTERS

(71) Applicant: Capital One Services, LLC, McLean, VA (US)

(72) Inventors: Amanda Harrington Legge, Los Altos, CA (US); Sunil Shah, Fremont, CA (US); Apurva Shah, San Mateo, CA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/851,046

(22) Filed: Apr. 16, 2020

(65) Prior Publication Data

US 2021/0021669 A1    Jan. 21, 2021

Related U.S. Application Data

(63) Continuation of application No. 16/514,761, filed on Jul. 17, 2019, now Pat. No. 10,659,525.

(Continued)

(51) Int. Cl.
H04L 29/08    (2006.01)
H04L 67/10    (2022.01)
(Continued)

(52) U.S. Cl.
CPC .......... *H04L 67/10* (2013.01); *H04L 67/2804* (2013.01); *H04N 21/4826* (2013.01); *H04N 21/8545* (2013.01); *H04W 4/80* (2018.02)

(58) Field of Classification Search
None
See application file for complete search history.

(56) References Cited

U.S. PATENT DOCUMENTS 1,009,155 A    11/1911    Gibbon
8,180,289 B1    5/2012    Glickman
(Continued)

*Primary Examiner* — Angela Nguyen
(74) *Attorney, Agent, or Firm* — Greenberg Traurig, LLP

(57) ABSTRACT

Systems and methods involving processing and/or mirroring data in real time involving one or more mobile devices and a plurality of NFC-connected interactive posters are disclosed. In one embodiment, an exemplary computer-implemented method may comprise: connecting a user mobile computing device to a server as well as coupling the device to a plurality of interactive posters via NFC; receiving user selections made on the interactive posters; processing content data related to the posters based on the user selections and/or other information; generating a GUI comprising interactive simulations corresponding to respective posters and/or statistics related to selections made on the posters; tracking, in real time, a specific experience of a user interacting with the posters; and transmitting, in real-time, data regarding the specific experience to the server.

20 Claims, 9 Drawing Sheets

Related U.S. Application Data

(60) Provisional application No. 62/839,602, filed on Apr. 26, 2019.

(51) Int. Cl.
  *H04L 67/561* (2022.01)
  *H04N 21/482* (2011.01)
  *H04N 21/8545* (2011.01)
  *H04W 4/80* (2018.01)

(56) References Cited

U.S. PATENT DOCUMENTS

| | | | |
|---|---|---|---|
| 8,565,791 B1 * | 10/2013 | Schilit | H04W 64/00 |
| | | | 455/456.3 |
| 9,071,282 B1 | 6/2015 | Want | |
| 9,355,409 B2 | 5/2016 | Vallat | |
| 2009/0144456 A1 | 6/2009 | Gelf | |
| 2010/0075666 A1 | 3/2010 | Garner | |
| 2011/0225421 A1 | 9/2011 | Han | |
| 2012/0088487 A1 * | 4/2012 | Khan | G06Q 20/322 |
| | | | 455/418 |
| 2012/0143661 A1 | 6/2012 | Roberts | |
| 2012/0196586 A1 | 8/2012 | Grigg | |
| 2013/0059534 A1 | 3/2013 | Sobalvarro | |
| 2014/0026048 A1 | 1/2014 | Spirer | |
| 2014/0062687 A1 | 3/2014 | Voticky | |
| 2014/0113549 A1 | 4/2014 | Beg | |
| 2014/0176991 A1 * | 6/2014 | Yun | G06F 3/0482 |
| | | | 358/1.15 |
| 2016/0065268 A1 | 3/2016 | Dobyns | |
| 2016/0092966 A1 | 3/2016 | Vigier | |
| 2018/0300761 A1 | 10/2018 | Pittman | |

* cited by examiner

10 # COMPUTER-BASED PLATFORMS/SYSTEMS, COMPUTING DEVICES/COMPONENTS AND/OR COMPUTING METHODS FOR ONE OR MORE TECHNOLOGICAL APPLICATIONS INVOLVING REAL-TIME DATA PROCESSING BETWEEN A SERVER, ONE OR MORE MOBILE COMPUTING DEVICES AND NEAR FIELD COMMUNICATION CONNECTED INTERACTIVE POSTERS

CROSS-REFERENCE TO RELATED APPLICATION(S) INFORMATION

This is a continuation of application Ser. No. 16/514,761, filed Jul. 17, 2019, now U.S. Pat. No. 10,659,525, and claims benefit/priority to U.S. provisional application No. 62/839,602, filed Apr. 26, 2019, which are incorporated herein by reference in entirety.

FIELD OF TECHNOLOGY

The present disclosure generally relates to an improved computer-based platform or system, improved computing components and devices and/or improved computing methods configured for one or more novel technological applications of processing information and communications in real time involving mobile computing devices, a back-end server and Bluetooth™-coupled interactive posters, including encryption, network operation and/or other features.

BACKGROUND OF TECHNOLOGY

A computer network platform/system may include a group of computers (e.g., clients, servers, smart routers, etc.) and other computing hardware devices that are linked together through one or more communication channels to, for example, facilitate communication and/or resource-sharing, e.g. by processing that involves aspects such as one or more specifically programmed graphical user interfaces (GUIs) and/or other features of the present disclosure, among a wide range of uses.

SUMMARY OF DESCRIBED SUBJECT MATTER

In some embodiments, the present disclosure provides various exemplary technically improved computer-implemented methods, such as a method that includes steps such as:

connecting a user's mobile computing device in real-time to (i) a plurality of interactive posters via an encrypted Bluetooth session and to (ii) a server via an encrypted session, wherein each interactive poster comprises electronically-coded interactive display imagery having selectable electronically-coded portions, and wherein each poster is coupled to the mobile computing device as a low energy peripheral;

receiving, by the mobile computing device in real-time and via Bluetooth, or more real-time user-specific selections corresponding to the selectable portions of the interactive posters chosen by the user;

receiving, by the mobile computing device in real-time, respective poster-specific content data related to a corresponding poster based on (i) at least one user-directed interaction with the poster and/or (ii) at least one non-user-directed interaction;

generating, by the mobile computing device, based on the respective poster-specific content data, a graphical user interface (GUI) comprising: (i) a simulation of the respective poster, including an interactive interface element that mirrors, in real time, the user-specific selection(s) of the selectable portions of the posters; and/or (ii) statistic information related to the posters and/or selection of the selectable portions of the posters;

tracking, by the mobile computing device in real time, a user-specific experience of the particular user in relation to the plurality of interactive posters to form user-specific experience data that is based on: (i) a plurality of user-directed interactions of the particular user with at least one poster, and/or (ii) the at least one non-user-directed interaction of the mobile computing device with one or more posters; and transmitting, by the mobile computing device in real-time, the user-specific experience data of the particular user to the server.

In some embodiments, aspects involving use of Bluetooth™ communications between the posters and the user's wireless device (e.g., tablet), in conjunction with capacitive ink touch-sensitive posters are utilized to digitally mirror physical selections made on the posters to the user's tablet in real-time. Various such technical solutions herein may also enable tracking the user's explorations of posters, i.e., the initial areas of interest that a user explored before making their final poster selections, as well as visualizing additional information related to selections, posters and/or information associated with the user's interactions.

In some embodiments, the present disclosure also provides exemplary technically improved computer-based systems and computer-readable media, including media embodied an application ("App") whether resident on a device or provided for download via a server, that include or involves features, functionality, components and/or steps consistent with those recited above.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
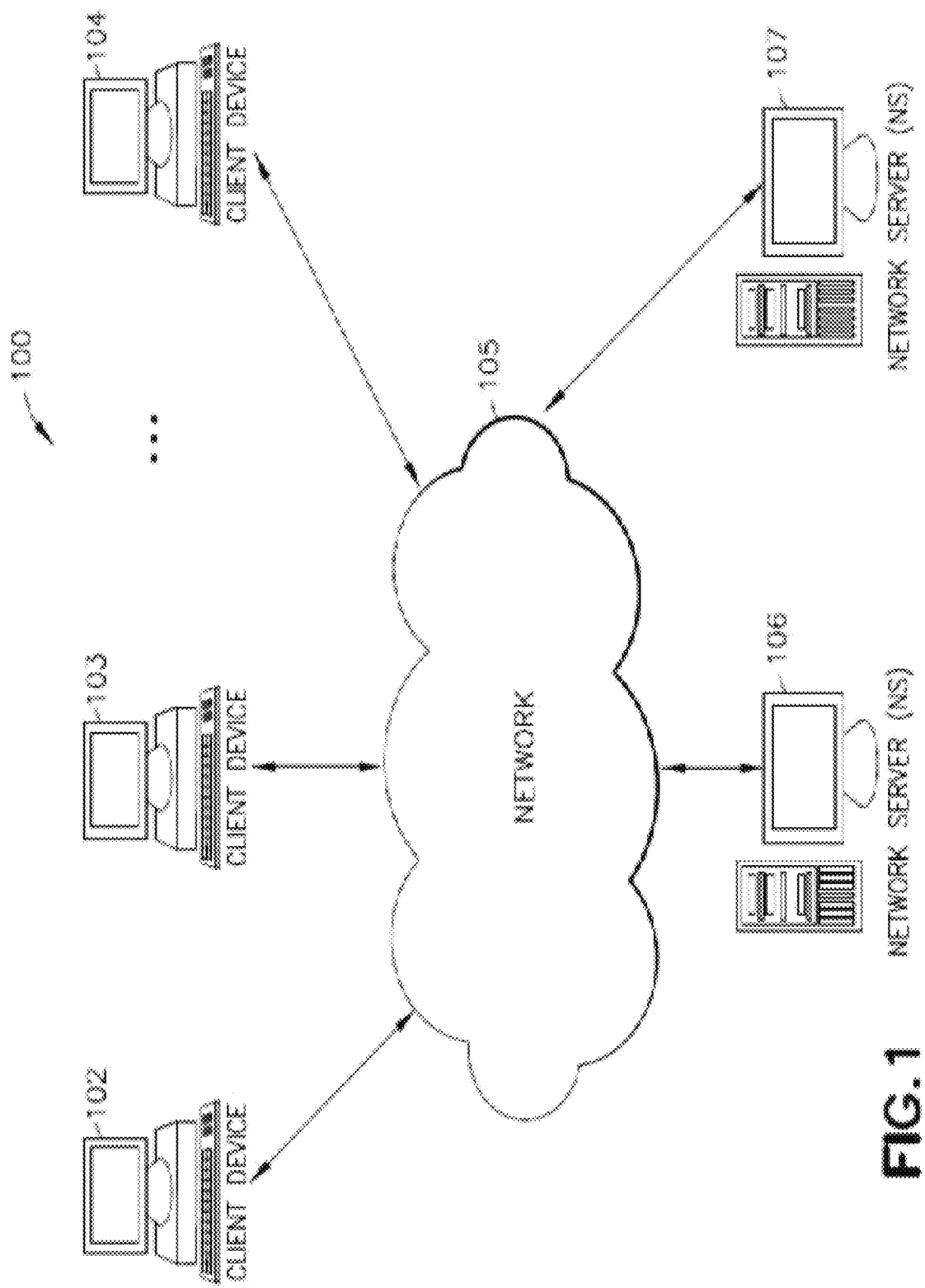
FIG. 1 is a block diagram depicting an exemplary computer-based system and platform, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIG. 1 depicts a block diagram of an exemplary computer-based system/platform 100 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer- or machine-readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc.

Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
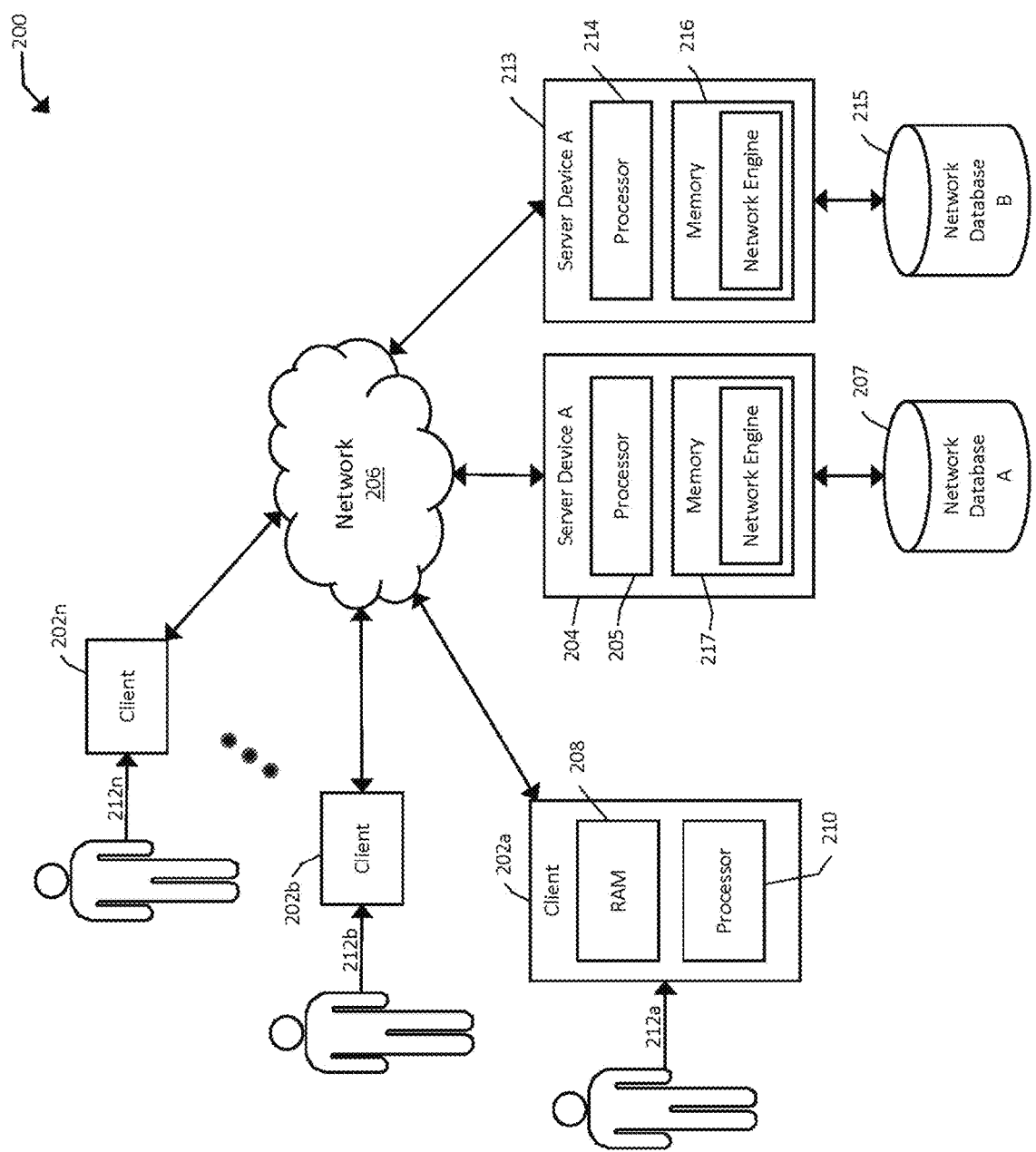
FIG. 2 is a block diagram depicting another exemplary computer-based system and platform, in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b thru 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a-n may also comprise a number of external or internal devices such as a mouse, a CD-ROM, DVD, a physical or virtual keyboard, a display, or other input or output devices.

In some embodiments, examples of member computing devices 202*a-n* (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202*a-n* may be specifically programmed with one or more application programs in accordance with one or more principles/methodologies detailed herein. In some embodiments, member computing devices 202*a-n* may operate on any operating system capable of supporting a browser or browser-enabled application, such as Microsoft™, Windows™, and/or Linux. In some embodiments, member computing devices 202*a-n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202*a-n*, users, 212*a-n*, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202*a-n* may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 3:
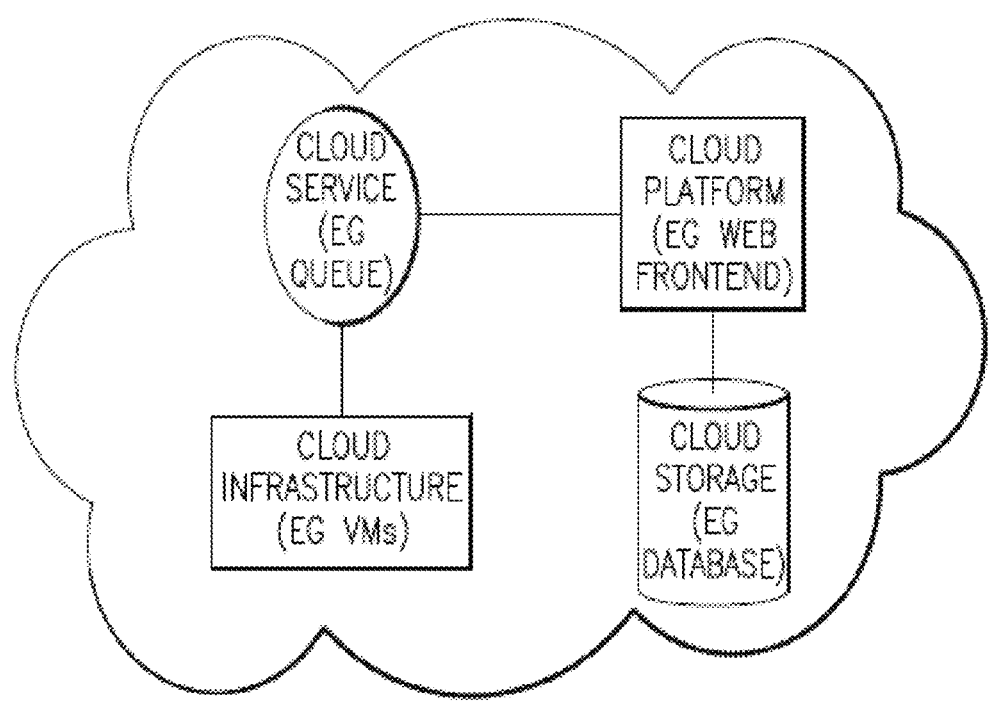
FIGS. 3 and 4 are diagrams illustrating two exemplary implementations of cloud computing architecture/aspects with respect to which the disclosed technology may be specifically configured to operate, in accordance with one or more embodiments of the present disclosure.
Figure 4:
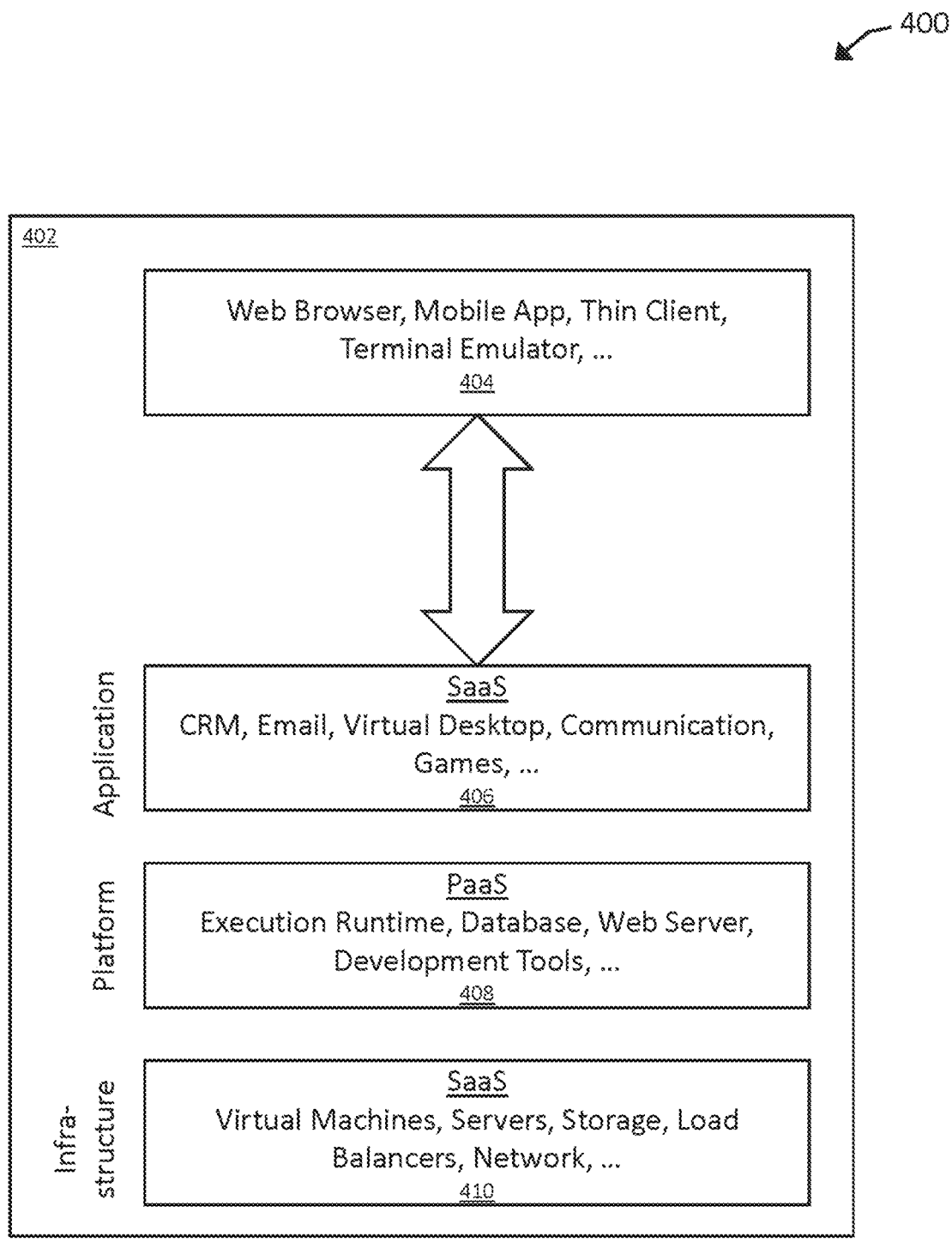

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 3 and 4 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

FIGS. 5 through 8B illustrate systems and methods of processing information and communications in real time involving mobile computing devices, a back-end Web server, and interactive posters that are coupled via Bluetooth to each other and at least one mobile device. The following embodiments provide technical solutions and/or technical improvements that overcome technical problems, drawbacks and/or deficiencies in the technical fields involving interactive posters, such as electronically- or computer-interactive posters. As explained in more detail, below, technical solutions and/or technical improvements herein include aspects of improved security (e.g., secure data, secured communications, encryption, etc.), network connectivity such as use of Bluetooth and Bluetooth authentication, tracking data and activity related to poster interactions and explorations of the posters by the user as well as to related statistics, mirroring data between electronic devices, and/or real-time information processing among computing components of the system. Based on such technical features, further technical benefits become available to users and operators of these systems and methods. Moreover, various practical applications of the disclosed technology are also described, which provide further practical benefits to users and operators that are also new and useful improvements in the art.

Figure 5:
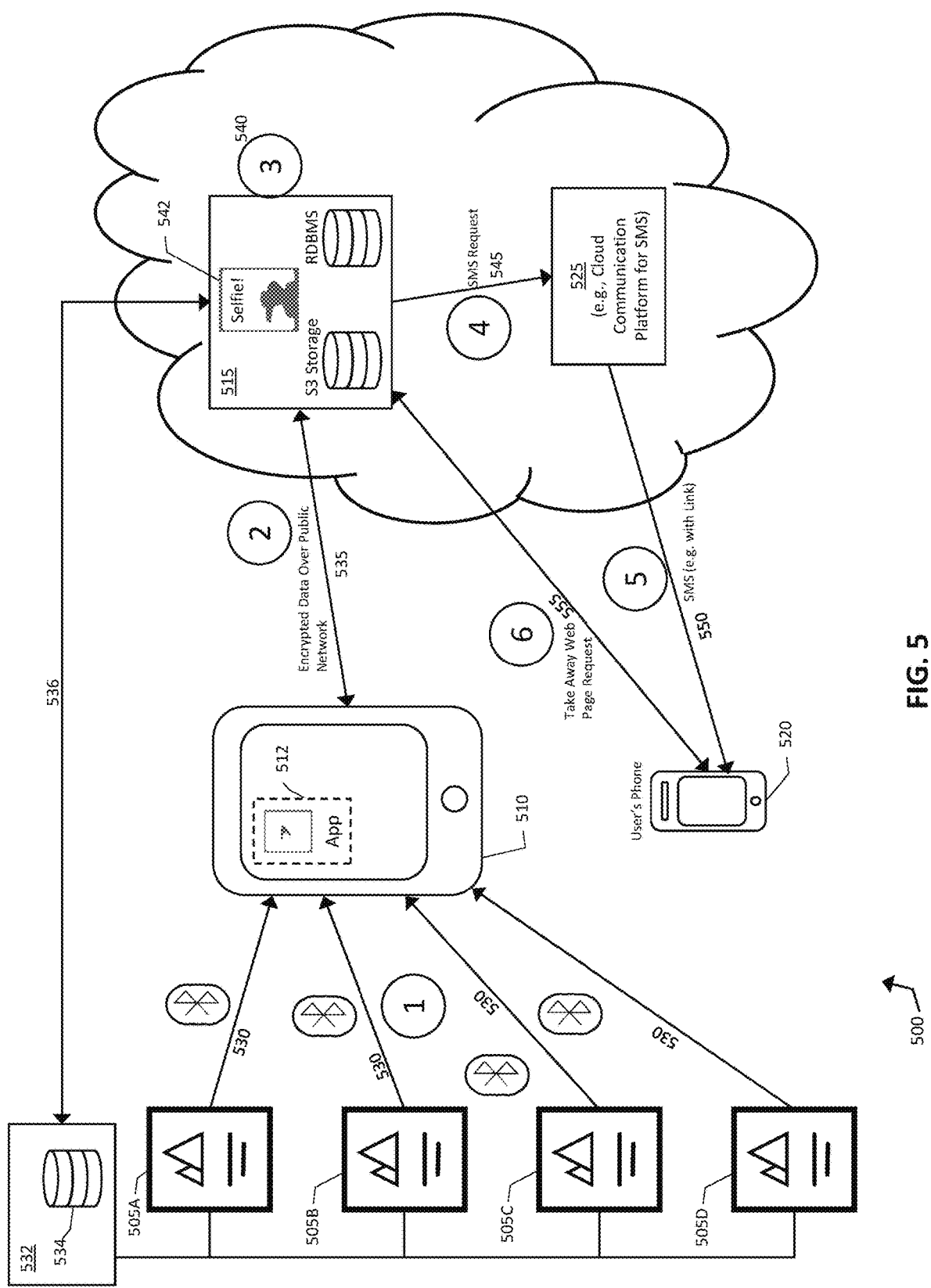
FIG. 5 depicts a block diagram of another exemplary computer-based system or platform, in accordance with one or more embodiments of the present disclosure.

FIG. 5 depicts a block diagram of another exemplary computer-based system 500 or platform in accordance with one or more embodiments of the present disclosure. Here, not all of the components illustrated in FIG. 5 may be required to practice one or more embodiments, and variations in the arrangement and type of the components may be made without departing from the spirit or scope of various embodiments of the present disclosure. As shown in FIG. 5, the system 500 may comprise a plurality of interactive posters 505*a*, 505*b*, 505*c*, 505*d*, a first device 510 such as a network-connected tablet associated with a user, at least one Web server 515 in communication with the first device 510 over a network such as a public network, an SMS/text messaging component 525 such as a cloud communication platform for sending SMS messages, and a second device 520 such as a smartphone or other mobile device associated with the user. Referring to FIG. 5, six exemplary steps beginning with user interaction at 'Step 1' 530 with the interactive posters 505, and proceeding through associated communication and data processing steps, Step 2 through Step 6, that subsequently occur among the computing devices in the system 500, are shown.

In some embodiments, innovations of the present disclosure may be described in the context of the computerized/computer-implemented interactive posters 505 in conjunction with the interactions that commence, in Step 1 at 530, between the first device 510 and the interactive posters 505. With regard to the physical interaction with the posters 505, the user (e.g., owner or operator) of the first device 510 and the second device 520 approaches and interacts with the interactive posters 505. While the interaction may be near-field interaction or detection of the user's or their phone's proximity, in the illustrative embodiments described below, the interaction comprises the user touching various touch-responsive areas of the interactive posters 505. Here, for example, the interactive posters 505 may be capacitive ink posters or conductive ink posters that have metal-patterned regions used to electrically detect and register touches may by individuals at predetermined points on the poster, i.e., the spots at which the metal "ink" touch sensors are printed. Nonlimiting examples of such posters include posters made by InkPut™, or by other capacitive or conductive ink poster companies. Interactions or selections of such posters may also be implemented via near-field wireless communication (NFC), such as posters made by 40Visuals™, and other NFC poster companies. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other. In some embodiments, systems and methods herein may begin tracking these touches or interactions and storing associated data once the user has entered within Bluetooth™ communication range of the posters 505 and/or once the user has been authenticated into an encrypted session via Bluetooth™, as explained in more detail below.

Non-Limiting Illustrative Examples of User/Device Authentication and Establishing Secure Session In FIG. 5, the interactive posters 505a, 505b, 505c, 505d may be coupled to the Web server 515, such as via a network, as well as coupled to each other, such as via a wired connection or a Bluetooth link. According to embodiments of the present disclosure, the Web App 512 of the first device 510 may be utilized to perform various important communication, authentication and encryption features, particularly at the start (Step 1) of the exemplary six-step process described herein. The Web App 512 may already be resident on the first device 510, or it may be downloaded onto the first device 510 at the start of various disclosed embodiments. Here, for example, a user may be prompted to download the Web App 512 when he or she comes within range of the posters 505, or the Web App 512 may be installed whenever the user otherwise desires to take advantage of the disclosed technology. Once the Web App 512 is loaded or begins operating on the first device 510, the Web App 512 securely authenticates itself with the Web server 515 and establishes a secure session therewith, including encryption of any data or information being transmitted between the first device 510 and the Web server 515. At this time, the Web App 512 and the first device are connected to all of the posters 505 within range via Bluetooth connection. Once the user and first device 510 are interconnected with the posters 505, the user may begin making their touch selections in the touch-sensitive areas of the interactive posters 505. Further, as a result of the secure Bluetooth connection between the first device 510 and the posters 505, the user's selections on the posters 505 are securely mirrored to the first device 510, e.g., the user's tablet, via the Web App 512.

As described herein, various embodiments of the exemplary inventive computer-based systems/platforms, the exemplary inventive computer-based devices, and/or the exemplary inventive computer-based methods or components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs). These examples are, of course, illustrative and not restrictive.

Turning back to the physical interactions between the user and the posters 505, various data including the timing of the touches, the specific poster 505 touched, the area within the respective poster 505 that is touched, and, optionally, information regarding any user devices that are detected in proximity at the time of the touches, are all registered and stored for subsequent processing. This data may be stored both locally via the posters 505 or in at least one computing component 532 or associated database 534, and/or the data may be communicated, at 536, and stored remotely at the Web server 515 or in an associated remote database.

Non-Limiting Illustrative Examples of Pre-Processing and Encryption Via the Web App In another step involving the user, typically performed in an earlier phase of the six-step process, the user may enter various identifying information, such as name, phone number, email address, and/or an identifying image such as a selfie. Further, if the identifying information is a picture such as a selfie, a filtering effect may be provided to the picture by the Web App 512 to provide an adjusted image that is augmented, altered and/or configured to align with the subject matter of the interactive posters 505 and/or with the selections that the user has made on each such poster. Once any such filtering or adjustment of the user image is completed, various identifying data regarding the user's interactions with the posters is encrypted by the Web App 512. Here, for example, the Web App 512 may encrypt information including the geographical location of the posters 505, the user's selections made on each of the posters 505, date and time stamp information associated with the user's interactive session, as well as the user's personal information such as name, phone number, email address, and image. Once this information is encrypted, it may be sent, at 535, to the Web server 515, such as via a network.

Non-Limiting Illustrative Examples of Web Server: Pre-Processing and Internal Processing Once start of user interaction with the posters 505 has been confirmed, the Web server 515 performs processing, in Step 3 at 540, related to processing data collected centrally at the Web server 540 and distributing associated information and Web pages to the user. Upon receipt of the encrypted personal information, the Web server 515 decrypts this information and stores it in one or more databases. In some embodiments, the Web server 515 may then also create a folder in which to store a deliverable to the user, such as a Web page, and/or any of the necessary assets that the Web server 515 utilizes to create the deliverable, such the user's poster selection, the user's selfie, and the like. The Web server 515 may utilize additional security in creating the folder and providing the deliverable to the user. Here, for example, the Web server 515 may generate a 32-byte (256 bit) random number and create the folder with a name based on the random number. Further, when the deliverable is a Web page, the URL used for the Web page and sent to the user may include the random number, e.g., www.xyz.com/[Random#]/UserWebPage.htm. As such, here, use of the randomly-generated 32-byte number will ensure security of the User's deliverable Web page, unless they share the link with someone else. In some embodiments, the Web server 515 may also include additional information in the deliverable that may be of interest or otherwise useful to one or both of the user and/or a company associated with the interactive posters 505 or the Web server 515. Here, for example, such additional information may include: (i) recommendations to the user, including personalized recommendations based on the user's selections on the posters 505 and/or other user information acquired or known; (ii) recommendations for services that may benefit the user and/or the user may desire; (iii) recommended subscriptions to information-providing and/or other services, (iv) establishing additional, closer, and/or further relationship(s) with the user, and the like.

Non-Limiting Illustrative Examples of Web Server: Processing Information for Delivery Once the Web server 515 has generated and prepared the deliverable for transmission to the user, the Web server may initiate processing to distribute the deliverable. Here, for example, the Web server 515 may embed the URL link into a pre-existing SMS message. Further, as shown in the example embodiment of FIG. 5, the Web server 515 may then affect delivery of the SMS message, such as by initiating a request, at 545, to a third-party SMS server provider to send the SMS message. In some embodiments, other forms of distribution may be used, such as delivery to an email address, and/or other electronic communication to the user.

Non-Limiting Illustrative Examples of Transmission of Deliverable to User

In some embodiments, such as the example shown in FIG. 5, a third-party SMS service provider may then transmit the SMS message to the user, at 550, such as by sending the SMS message to the mobile phone number that the user provided via the Web App 512.

Non-Limiting Illustrative Examples of User Acquisition of Information in Deliverable Finally, referring to the embodiment of FIG. 5, the user may select customized information in the deliverable that has been prepared for the user by the Web server 515, which may then be provided to the user from the Web server 515, i.e., at 555. Here, for example, the user may select or click the secure link established using the random number, and then download the customized Web page generated by the Web server 515 for that user. Upon selection of the secure link, one or more Web pages, which may include information and/or recommendations customized for that user, will be loaded onto the user's smartphone, smartwatch and/or other computing element, component or device.

Figure 6:
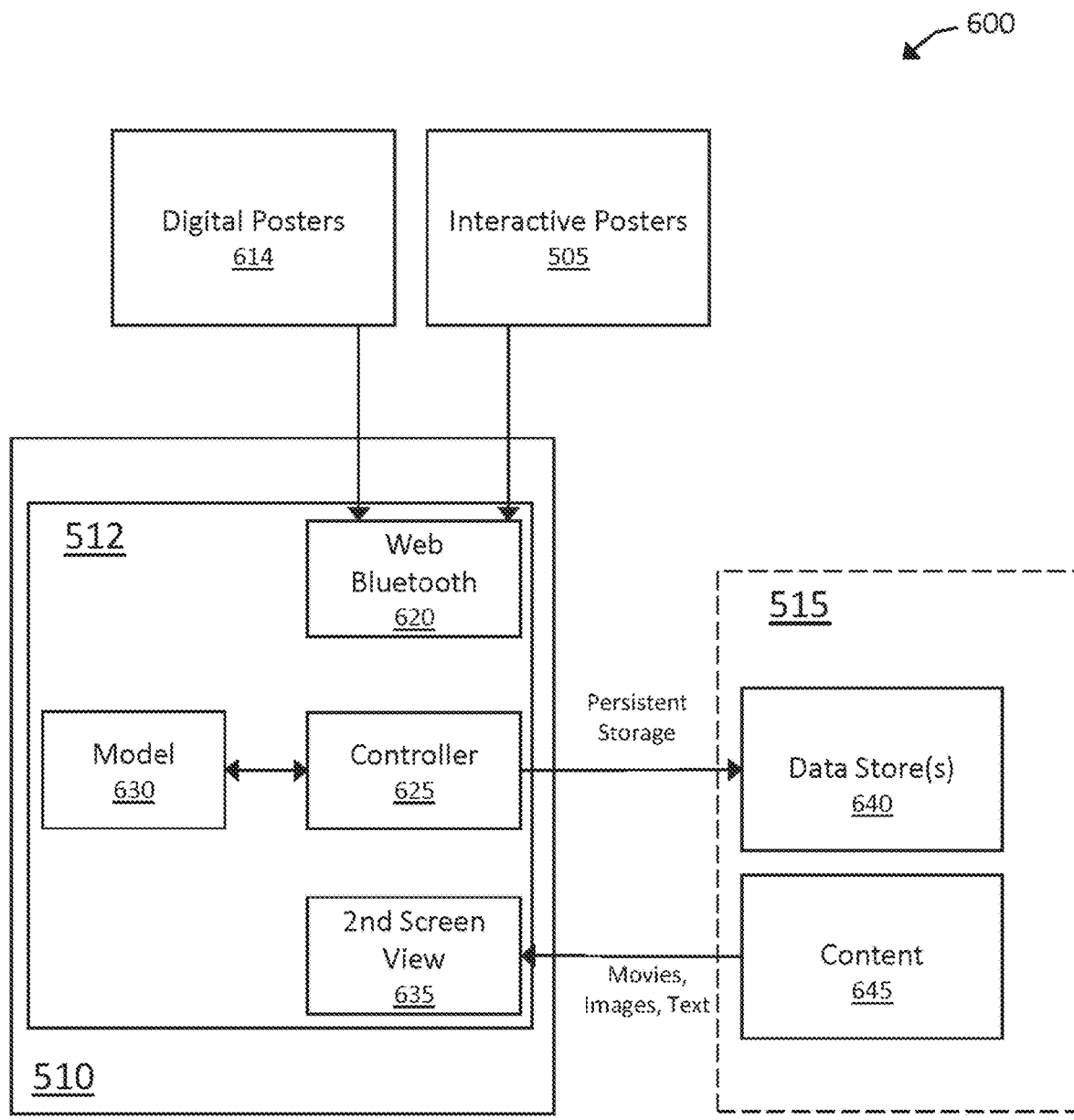
FIG. 6 depicts a block diagram of another exemplary computer-based system, in accordance with one or more embodiments of the present disclosure.

FIG. 6 depicts a block diagram of another exemplary computer-based system 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the system 600 may comprise one or more interactive (physical) posters 505, a first device 510 associated with the user containing a Web App 512, one or more digital posters 614 corresponding to the interactive posters 505 and generated by the Web App 512 for display on the first device 510, and a Web server 515 that may provide various functionality and/or connect the first device 510 to providers and/or computing components providing such functionality. In some embodiments, the Web App 512 may include a Web Bluetooth component 620, and Web App 512 and related GUI features may include subcomponents such as a second screen view 635 as well as a controller 625 and a model 630, which may be configured in a Model-View-Controller (MVC) framework able to implement a Model-View-Controller (MVC) pattern. Such MVC pattern may separate the modeling of the domain, the presentation, and the actions based on inputs into three separate classes: a model 630, one or more views 635, and a controller 625. The model 630 may contain or represents the data with which the system works. For example, the model 630 may manage the behavior and data of the application domain, respond to requests for information about its state (usually from a view 635), and respond to instructions to change state (usually from the controller 625). The view 635 manage the display of information. Views may be utilized to render some part of the model 630 as a user interface ("UI"). The controller 625 interprets various inputs, from the user and otherwise, and informs the model 630 and/or the view 635 to change as appropriate. In one embodiment, shown, the controller 625 incorporates inputs, such as inputs associated with the user and/or the NFC/Bluetooth interactive posters, and provides output represented as data in the model 630, which in some implementations may persist in a database. Finally, the controller 625 may feed such data to the view 635, e.g. via a presentation model, which governs how the data are displayed, and may prompt or interact with a user regarding information displayed and/or response thereto. For example, the controller 625 may receive information regarding the interactive posters including details of the user selections, which may be data in or derived from a format associated with the BLE (Bluetooth low energy) peripherals. Once the controller 625 receives such information, the controller 625 creates a model 630 to process the information and may uses it to communicate with one or more data store(s) 640. The model 630 is filled with information from the computing environment and associated databases and may process information used to update such databases and/or data store(s) 640. The model 630 is then used to create at least one view 635 that is returned as a response. Accordingly, such MVC framework may provide technical advantages such as greater efficiency and/or effectiveness regarding data processing, storage and communications as well as enabling real-time content delivery and communication in computing environments 600, as here. Services or functionality provided to the first device 510 via the Web server 515 may include one or more data stores 640, which may provide persistent storage for the Web App 512 and Web server 515, and/or a content provider 645, CMS (content management system), etc. that can provide media such as movies, images and text to the Web App 512 for display on the second screen view.

In the exemplary system 600 of FIG. 6, the data store(s) may be an EC2+DB database provided by Amazon Web Services (AWS) and may be used as a persona factory. Similarly, an exemplary content provider 645 may be a CloudFront content store as provided by AWS. Further, the Web App may be a native app resident on a Mac or PC device, and the first device 510 may be any variety of mobile user device, such as a Chrome on Android tablet, Mac or PC. In some embodiments, a user's interactive experience may be debugged by running a native poster app and Chrome browser via a progressive Web app (PWA) simultaneously on a Mac or PC. In operation, the first device 510 and the Web App 512 may engage with the interactive posters 505 via a Web Bluetooth module 620. In some embodiments, Web App 512 use of the MVC (model-view-controller) framework also provides technical solutions and technical advantages for processing events and updates within the Web App 512 in real time. Further, the Web App may process the interactive posters as Bluetooth low energy (BLE) peripherals. In some embodiments, treating the interactive posters 505 as BLE peripherals is also a technical solution that provides technical advantages in generating the simulations, as they may be more effectively and efficiently model in real time such as with interactive GUI elements that mirror the physical posters in real time. In the illustrative embodiment disclosed, the Web App 512 may simulate such a Bluetooth Low Energy (BLE) peripheral, such as a digital superhero poster, including simulation of the poster's distinct touch areas. Here, for example, the BLE peripheral simulation may also include interactive GUI elements corresponding to the 6 different comic-themed selection options. On initialization, a BLE peripheral may be created for each poster, and device name(s) of each BLE peripheral may be chosen to correspond to each interactive poster. Moreover, use of third-party products associated with such BLE peripheral simulation may provide various technical solutions. For example, the Web App 512 may utilize identifiers such as serviceUUID and characteristicUUID, e.g. as used in Novalia's products, to create and advertise the service or offerings during the simulation of the BLE peripheral. In this example, the poster's touch areas may be simulated via button IDs 1 through 6, allowing for real-time mirroring of poster selections. With regard to such Bluetooth Low Energy (BLE) peripheral functionality, low energy peripherals may also be simulated without reference to the Bluetooth trade name. Here, for example, the interactive posters may be a 'low energy' peripherals by being configured to remain in a sleep mode until each respective electronically-coded interactive display imagery responds to at least one real-time user-specific interaction associated with the particular user, wherein such user-specific interaction is chosen from (i) at least one user-directed interaction, when the particular user interacts with at least one electronically-coded portion of a respective electronically-coded interactive display imagery of a respective poster of the plurality of interactive posters, or (ii) at least one non-user-directed interaction, when the mobile computing device, operated by the particular user, communicates with one or more posters of the plurality of interactive posters, the at least one electronically-coded portion of the respective electronically-coded interactive display imagery of the respective poster of the plurality of interactive posters, or both.

Figure 7:
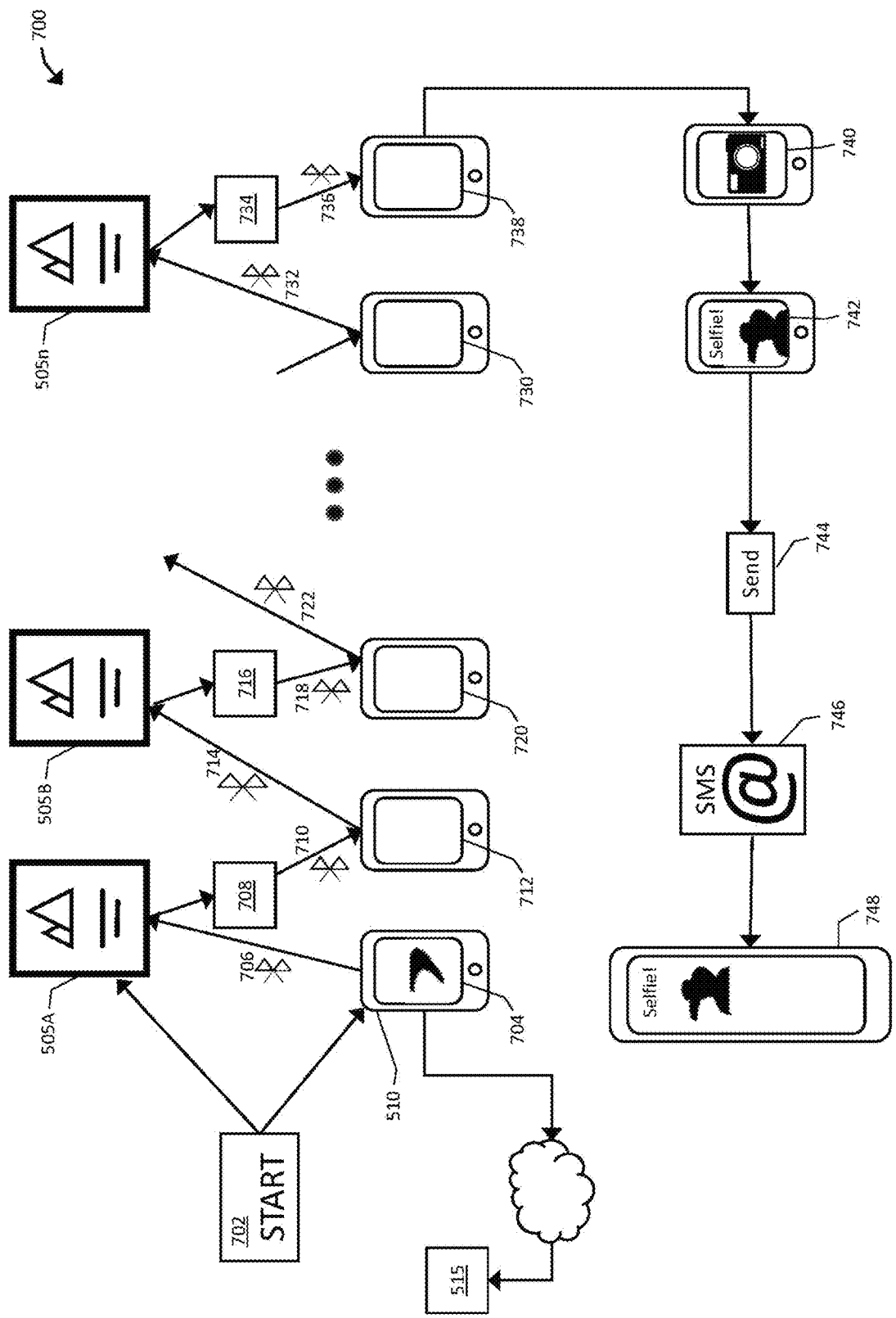
FIG. 7 depicts a high-level flow diagram illustrating an exemplary computerized interactive user experience, in accordance with one or more embodiments of the present disclosure.

FIG. 7 depicts a high-level flow diagram illustrating an exemplary computerized interactive user experience 700 in accordance with one or more embodiments of the present disclosure. The exemplary user experience 700, starting at 702, may commence when a user comes within proximity of the interactive posters and initiates the Web App on their mobile device 510, at 704. The Web App may connect, at 704, with the Web server 515 and begin the secure session, as detailed elsewhere herein. After the session is initiated, the user first engages with a first interactive poster 505A, wherein Bluetooth communication between the first device 510 and the first poster 505A is established, at 706. The user then engages with the first poster 505A and provides a first interaction or first user selection 708, such as a touch selection of one option at a touch-sensitive region. This selection 708 is mirrored in real time via the Bluetooth connection, at 710, such that the user's first selection 708 at the first poster 505A is contemporaneously mirrored onto a simulation of the first poster that is generated by the Web App and depicted on the user's mobile device, at 712, i.e., displayed on the first device 510. Various other information such as statistics regarding the first poster 505A may also be displayed.

In general, functionality regarding the real-time assembly of statistics (e.g., via various network and/or Bluetooth connection(s), etc.), the storage and maintenance of statistics (e.g., via the Web App, Web server, etc.), and the real-time dissemination of such statistics (e.g., via certain Web server functionality, etc.) provide technical solutions to the technical problems exigent in previous attempts to use such information to its fullest, such as interactive/real-time, potential. Further, statistics regarding the interactive posters may include or involve data regarding other users interactions with particular posters, data regarding user-interactions with posters at the same or geographically different locations, statistics that consider or are based on same or similar portions of a poster or related posters, and the like. Other relevant statistics are also described elsewhere herein.

The user may then move in to close proximity with a second interactive poster 505B, at which time Bluetooth communication is established between the first device 510 and the second poster 505B, at 714. As with the first poster 505A, the user may make a physical interaction with the second poster 505B, establishing a second user selection 716, such as a touch selection of one option at a touch-sensitive region. This selection 716 is mirrored in real time via the Bluetooth connection, at 718, such that the user's second selection 716 at the second poster 505B is contemporaneously mirrored onto a simulation of the second poster that is generated by the Web App and depicted on the user's mobile device, at 720. Bluetooth communication with a new interactive poster may then be established, at 722, though the full series of posters is not shown in FIG. 7 for the sake of conciseness. After display and interaction, at 730, with a simulation of a second-to-last interactive poster (not shown), the user may then move in to close proximity with a final interactive poster 505n, at which time Bluetooth communication is established between the first device 510 and the final poster 505n, at 732. As with the first two posters, the user may make a physical interaction with the final poster 505n, establishing a final user selection 734, such as a touch selection of one option at a touch-sensitive region. This final selection 734 is mirrored in real time via the Bluetooth connection, at 7365, such that the user's final selection 734 at the second poster 505B is contemporaneously mirrored onto a simulation of the final poster that is generated by the Web App and depicted on the user's mobile device, at 738.

Upon completion of interactions with the posters, the user experience may continue as described above. In some embodiments, for example, the user may then provide their personal information including a picture, at 740. The picture may then be modified, such as by the Web App 512, to provide, at 742, an adjusted image that is augmented, altered and/or configured to align with the subject matter of the interactive posters 505 and/or with the selections that the user has made on each such poster. Then, at 744, the Web server 515 initiates instructions to have the deliverable provided to the user. Next, at 746, the deliverable is provided to the user, such as via an SMS message or an email. Finally, the user then opens the deliverable, at 748, which provides any customized content or information intended for the user, such as a customized link generated by the Web server 515.

Figure 8A:
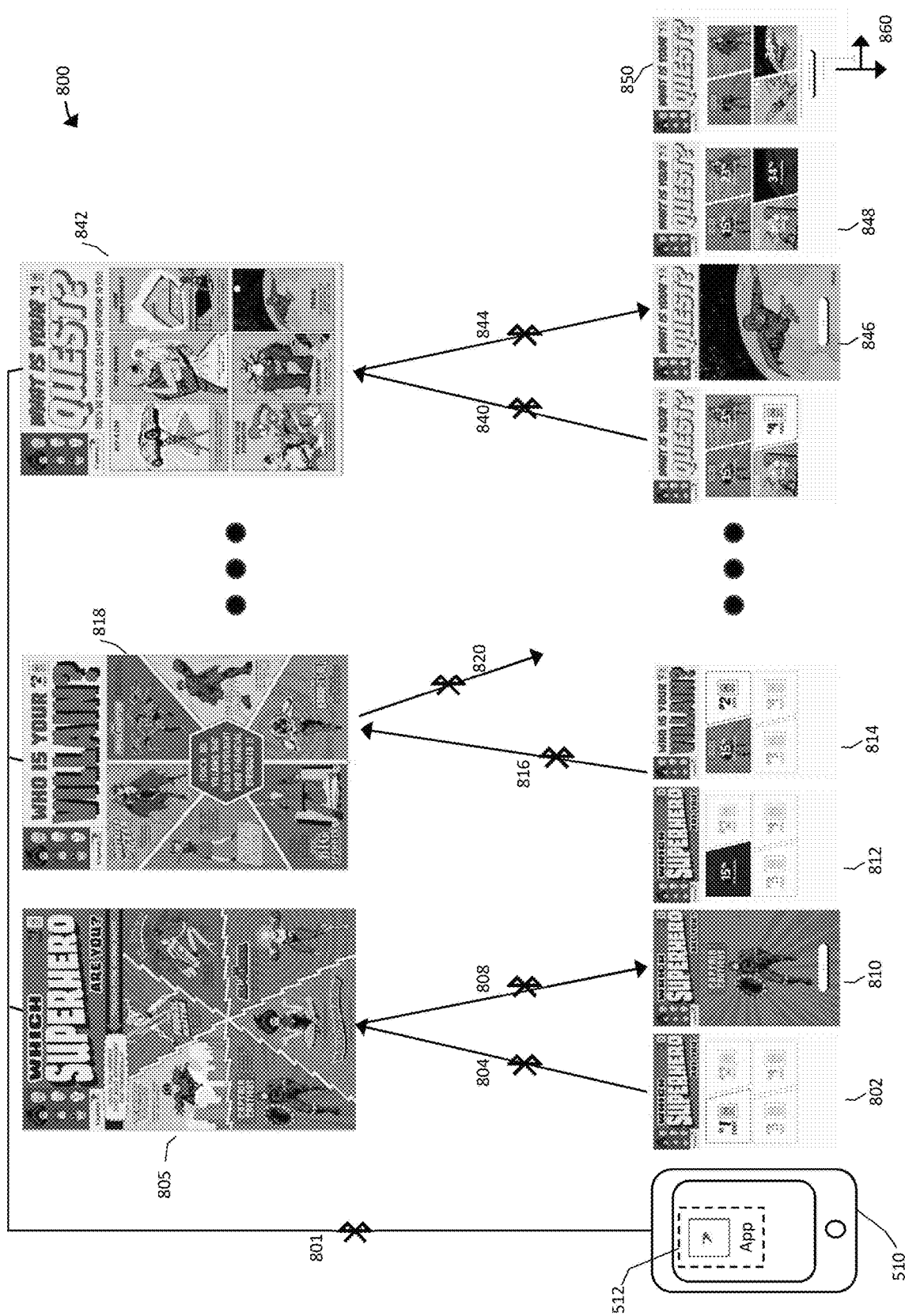
FIGS. 8A-8B depict a flow diagram illustrating an exemplary computerized interactive user experience, including details of one representative application thereof, in accordance with one or more embodiments of the present disclosure.
Figure 8B:
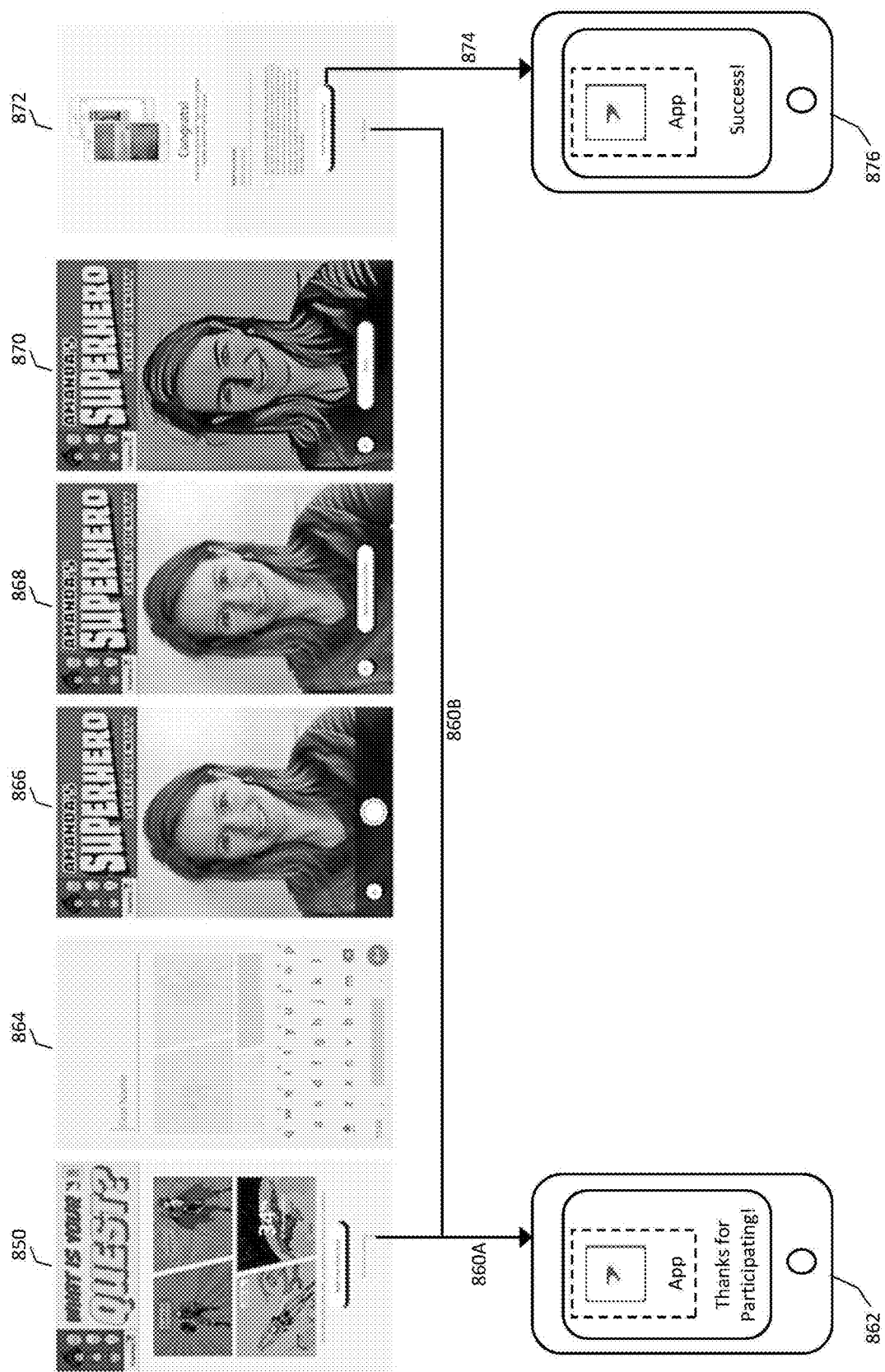

FIGS. 8A-8B depict a flow diagram illustrating an exemplary computerized interactive user experience 800, detailing one representative and practical application thereof, in accordance with one or more embodiments of the present disclosure. As shown via 801 in FIG. 8A, the user device 510 may be coupled via Bluetooth to all of the interactive posters 805, 818 . . . 842. The exemplary user experience 800, starting at 802, may commence when a user comes within proximity of the interactive posters and initiates the Web App 512 on their mobile device 510. After a session is initiated, the user first engages in Bluetooth communication, at 804, with a first interactive poster 805. In the example embodiment shown, the first poster 805 may be a capacitive ink poster asking "Which Superhero Are you?", referring to a superhero related to the user's financial behavior, and having several touch-sensitive regions that allow the user to indicate the type of (financial) superhero they are. As explained above, the user then engages with the first poster 805, and provides a touch selection, which is transmitted to and mirrored on the user device, at 808. The Web App then displays, at 810, a GUI that includes an image corresponding to the type of superhero that the user selected. At 812 and 814, the user may then view and interact with the information and/or content subsequently provided to the user, e.g., via the Web App 512 and Web server 515. Next, the user will engage with a second interactive poster 818, including establishing Bluetooth communication between the user device 510 and the second poster 818, at 816. In the example of FIGS. 8A-8B, the second poster asks the user "Who is Your Villian?", here, referring again to a type of financial 'enemy' that the user faces in their life. As with the first poster 805, a selection is made and transmitted, at 820, to the user device for mirroring via a simulation of the second poster 818 displayed to the user. Other posters, such as "What is Your Current [e.g. financial] Battle?" may also be engaged with by the user.

At the end of the physical experience, the user approaches a final poster 842 entitled "What is Your Quest?", again referring to a financial desire that the user presently has, and Bluetooth communication is established between the user device 510 and the final poster, at 840. Then, as with prior posters 805, 818, a selection is made and transmitted, at 844, to the user device for mirroring via a simulation of the final poster 842 displayed to the user. The Web App may then display an image corresponding to the quest that the user selected, at 846, as well as provide additional screens, 848 and 850, allowing the user to view information and/or interact with content that is provided to the user via the Web App 512 and the Web server 515. At the final physical experience page displayed 850, the user is prompted to provide various information or navigation instructions, at 860. Here at screen 850, as shown in FIG. 8B, the user may opt to finish the experience, at 860A, at which time they would be provided with a final screen 862 thanking them for participating. Alternatively, the user may opt to enter various personal information, at 864, such as name, phone number, email address and the like. Further, the user may opt to provide an image at 866, such as a selfie. In the example experience shown, the Web App then alters the selfie, at 868 and 870, to generate a comic book like adjusted image of the user, as shown at 870. At a final interactive screen, 872, the user may be prompted to confirm that a final summation of the information that the user provided, including superhero images and/or the superhero motif that the user selected, may then be transmitted to the user, such as via an SMS message sent to their smartphone or other mobile device and/or via email. As mentioned above, such deliverable provided to the user may also include recommendations such as, here, financial recommendations that are personalized to the user based on the selections that the user made and/or any other information available regarding the user or their financial situation. For example, such a financial recommendation may include a recommendation, based on selecting a particular character, that would reference specific product(s) and/or service(s) relevant for that user, e.g., refinance a loan, open an account, get insurance, etc. In one embodiment, the Web page would keep the user within entity's computing environment, which provides technical advantages such as maintaining needed security as well as various practical advantages to keep the user within an online environment and/or to develop further helpful information regarding the user via the provider's Website. Following such functionality, e.g. upon acceptance and completion of this step, at 874, the Web App generates a final 'success' screen for display to the user, thanking them for participating in the experience 800.

At least some aspects of the present disclosure will now be described with reference to the following numbered clauses.

1. A computer-implemented method, comprising:
    establishing, by a first mobile computing device associated with a user, a plurality of communication links comprising:
        i) a first communication link to a server;
        ii) one or more second communication links to a respective plurality of interactive posters;
    wherein each of the one or more second communication links are based on a Bluetooth communication protocol or other near-field wireless communication (NFC) protocol;
    receiving, by the first mobile computing device, via the one or more second communication links, user selections made by the users on the plurality of interactive posters;
    tracking, via the first mobile computing device, in real time, based on the user selections, a user interaction experience of the user while the user interacts with the plurality of interactive posters to form the user interaction data;
    transmitting, by the first mobile computing device, in real-time, the user interaction data to the server;
    receiving, by the first mobile computing device, from the server, content data related to the plurality of interactive posters;
        wherein the content data has been generated by the served based at least in part on the user interaction data;
        wherein the content data comprises one or more statistics of one or more selection made by at least one other user on the plurality of interactive posters;
        wherein the one or more selection made by at least one other user is related to one or more user selections made by the user; and
    generating, by the first mobile computing device, a graphical user interface (GUI), the GUI comprising
        i) one or more user-personalized interactive simulations corresponding to each respective poster of the plurality of interactive posters, and
        ii) at least a portion of the content data.

2. A computer-implemented method, comprising:
    establishing, by a first mobile computing device associated with a user, a plurality of communication links comprising:
        i) a first communication link to a server;
        ii) one or more second communication links to a respective plurality of interactive posters;
    wherein each of the one or more second communication links are based on a Bluetooth communication protocol or other near-field wireless communication (NFC) protocol;
        wherein each interactive poster in the plurality of interactive posters comprises one or more regions configured to allow the user to make one or more user selections;
    receiving in real time, by the first mobile computing device, via the one or more second communication links, user selections of the one or more regions made by the user on the plurality of interactive posters;

receiving, from the server in real-time, by the mobile computing device, respective poster-specific content data related to one or both of the respective poster of the plurality of interactive posters and the user selections;

generating, by the mobile computing device, at least one graphical user interface (GUI) that comprises:
i) a respective interactive simulation of the respective interactive poster, comprising at least one interactive interface element that mirrors, in real time, the at least one real-time user-specific selection of the one or more regions of the respective poster of the plurality of interactive posters, and
ii) the content data and/or at least one statistic related to at least one selection of the one or more regions of the respective poster of the plurality of interactive posters by at least one other user;

tracking, in real-time, by the mobile computing device, a user-specific experience of the user in relation to the plurality of interactive posters to form user-specific experience data; and transmitting, in real-time, by the mobile device, via the encrypted communications, the user-specific experience data of the user to the server.

3. The method of claim 1 or claim 2 or the invention of any claim herein, further comprising operating a software application on the first computing device, the software application configured to communicate with the server and execute one or more steps of the method.

4. The method of claim 3 or the invention of any claim herein, wherein the software application may be implemented via a model-view-controller (MVC) framework and/or subcomponents, to thereby improve efficiency and/or effectiveness and/or to enable real-time communications via interaction with the interactive posters as Bluetooth Low Energy (BLE) peripherals.

5. The method of claim 3 or the invention of any claim herein, wherein the software application is configured to execute by processing instructions regarding the plurality of interactive posters by handling the interactive posters as Bluetooth low energy (BLE) peripherals.

6. The method of claim 1 or claim 2 or the invention of any claim herein, wherein the connecting the mobile computing device to the server via encrypted communications over the at least one network comprises an encrypted non-Bluetooth session.

7. The method of claim 2 or the invention of any claim herein, wherein each region of the one or more regions of the plurality of interactive posters comprise respective electronically-coded interactive display imagery having one or more electronically-coded portions.

8. The method of claim 7 or the invention of any claim herein, wherein each interactive poster is configured to remain in a sleep mode until each respective electronically-coded interactive display imagery responds to at least one real-time user-specific interaction associated with the user, chosen from:
i) at least one user-directed interaction, when the user interacts with at least one electronically-coded portion of a respective electronically-coded interactive display imagery of a respective poster of the plurality of interactive posters,
ii) at least one non-user-directed interaction, when the mobile computing device, operated by the user, communicates with one or more posters of the plurality of interactive posters, the at least one electronically-coded portion of the respective electronically-coded interactive display imagery of the respective poster of the plurality of interactive posters, or both.

9. The method of claim 2 or the invention of any claim herein, wherein the poster-specific content data related to the respective poster of the plurality of interactive posters is based on at least one of:
i) the at least one user-directed interaction; and
ii) the at least one non-user-directed interaction.

10. The method of claim 9 or the invention of any claim herein, wherein the user-specific experience data that is based at least in part on a sequence of:
i) a plurality of user-directed interactions of the user with at least one poster of the plurality of interactive posters, and
ii) the at least one non-user-directed interaction of the mobile computing device with the at least one poster of the plurality of interactive posters.

11. The method of claim 1 or claim 2 or the invention of any claim herein, wherein at least one of the plurality of interactive posters comprises a touch-activated display.

12. The method of claim 1 or claim 2 or the invention of any claim herein, wherein at least one of the plurality of interactive posters is a composite structure having a foundation substrate layer and a touch-activated electronically-coded interactive display imagery, comprising conductive ink.

13. The method of claim 12 or the invention of any claim herein, wherein the foundation substrate layer comprises one or more materials chosen from at least one paper-based material, at least one plastic-based material, at least one wood-based material, and at least one stone-based material.

14. The method of claim 1 or claim 2 or the invention of any claim herein, further comprising:
providing additional statistics regarding a plurality of individuals other than the user who have interacted with the posters.

15. The method of claim 1 or claim 2 or the invention of any claim herein, further comprising:
providing interactive GUI functionality that enables the user to update or change the touch selections that the user made when interacting with the interactive posters.

16. The method of claim 1 or claim 2 or the invention of any claim herein, further comprising:
providing, via a software application, the server or a deliverable, recommendations to the user, such as personalized recommendations based on the user's touch selections.

17. The method of claim 1 or claim 2 or the invention of any claim herein, further comprising:
tracking, in real time, touch selection data regarding touch interactions made by individuals in geographically-separate interactive poster installations; and
providing the touch selection data in real time to the user.

18. The method of claim 1 or claim 2 or the invention of any claim herein, further comprising:
providing additional information to the user regarding subject matter related to the posters.

19. The method of claim 18 or the invention of any claim herein, wherein the additional information includes one or more of:
(i) subject matter related to information displayed on the plurality of interactive posters;
(ii) subject matter related to information displayed in the one or more regions;
(iii) statistics regarding a plurality of individuals who have interacted with the posters;

(iv) a recommendation to the user, including personalized information based on the user's selections on the posters and/or other information associated with the user known or acquired in connection with the user's engagement with the plurality of interactive posters;

(v) a recommendation regarding a service that is of interest or benefit to the user;

(vi) a recommended subscription to an information-providing and/or other service;

(vii) expanding one or more existing relationships with the user; and/or (viii) establishing a new relationship with the user.

20. A computer-implemented method executing via a software application resident on a first mobile computing device associated with a user, the method comprising:

executing the software application upon detecting that the first mobile computing device is in proximity to one or more of a plurality of interactive posters via near-field wireless communication (NFC) circuitry located on the first mobile computing device;

connecting the first mobile computing device to a server as well as coupling the device to all of the plurality of interactive posters within near-field wireless communication (NFC) range;

tracking, via an NFC protocol, a specific user experience of the user as the user engages at least one of the plurality of interactive posters to make user selections thereon;

receiving the user selections on the first mobile computing device from the interactive posters via the NFC protocol;

generating, via the software application, a graphical user interface (GUI) comprising interactive simulations corresponding to the interactive posters and respective user selections made thereon;

securely transmitting the user selections to the server;

receiving, from or via the server, at least one of information and content data related to the posters based on the user selections and/or other information regarding the user previously known or gathered during the user experience; and providing to the user, via the GUI, the at least one of information and content data.

21. The method of claim 20 or the invention of any claim herein, further comprising:

providing to the user, via the GUI, statistics related to selections made on the interactive posters.

Any publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method, comprising:

communicating, by a first mobile computing device associated with a user, with:

i) a server, over a first communication link;

ii) one or more interactive posters, over one or more respective second communication links;

receiving, by the first mobile computing device, via the one or more second communication links, at least one user selection made by the user on the one or more interactive posters;

wherein data associated with the user's interaction with the one or more interactive posters, including the at least one user selection, is processed or stored via the first mobile computing device as user interaction data;

transmitting, by the first mobile computing device, the user interaction data to the server;

receiving, by the first mobile computing device, from the server, content data related to one or more of the one or more interactive posters, the user interaction data, and the user;

wherein the content data has been generated by the server based at least in part on the user interaction data;

generating, by the first mobile computing device, a graphical user interface (GUI), the GUI comprising one or both of:

i) one or more user-personalized interactive simulations corresponding to each respective poster of the one or more interactive posters, and ii) at least a portion of the content data.

2. The method of claim 1, further comprising:

tracking, via the first mobile computing device, in real time, based on the at least one user selection, a user interaction experience of the user while the user interacts with the one or more interactive posters, which is included in the user interaction data.

3. The method of claim 1 wherein the content data comprises one or more statistics of one or more selection made by at least one other user on the one or more interactive posters, and wherein the one or more selection made by at least one other user is related to one or more user selections made by the user.

4. The method of claim 1, further comprising operating a software application on the first mobile computing device, the software application configured to communicate with the server and execute one or more steps of the method.

5. The method of claim 4, wherein the software application may be implemented via at least one of a model-view-controller (MVC) framework and/or one or more MVC subcomponents.

6. The method of claim 4, wherein the software application is configured to execute by processing instructions regarding the one or more interactive posters by handling the interactive posters as Bluetooth low energy (BLE) peripherals.

7. The method of claim 1, wherein the first mobile computing device is connected to the server by encrypted communications over the at least one network via an encrypted non-Bluetooth session.

8. The method of claim 1, wherein each poster of the one or more interactive posters comprises one or more regions configured to allow the user to make one or more user selections; and wherein each region of the one or more regions of the one or more interactive posters comprise respective electronically-coded interactive display imagery having one or more electronically-coded portions.

9. The method of claim 1, wherein at least one of the one or more interactive posters comprises a composite structure having a foundation substrate layer and a touch-activated electronically-coded interactive display imagery, comprising conductive ink.

10. The method of claim 1, further comprising:
tracking, in real time touch selection data regarding touch interactions made by individuals in geographically-separate interactive poster installations; and
providing, via the first mobile computing device, the touch selection data in real time to the user.

11. The method of claim 1, further comprising one or more of:
providing, via the first mobile computing device, additional statistics regarding a plurality of individuals other than the user who have interacted with the posters;
providing, via the first mobile computing device interactive GUI functionality that enables the user to update or change the touch selections that the user made when interacting with the interactive posters;
providing, via the first mobile computing device, additional information to the user regarding subject matter related to the one or more interactive posters.

12. A computer-implemented method executing via a software application resident on a first mobile computing device associated with a user, the method comprising:
executing the software application upon detecting that the first mobile computing device is in proximity to one or more interactive posters via near-field wireless communication (NFC) circuitry located on the first mobile computing device;
connecting the first mobile computing device to a server as well as coupling the device to the one or more interactive posters within near-field wireless communication (NFC) range;
tracking a specific user experience of the user as the user engages at least one of the one or more interactive posters to make user selections thereon;
receiving, via the NFC circuitry, the user selections on the first mobile computing device from the interactive posters;
securely transmitting the user selections to the server;
receiving, from or via the server, at least one of information and content data based on the user selections and/or other information regarding the user previously known or gathered during the user experience; and
providing to the user, via the GUI, the at least one of information and content data.

13. The method of claim 12 further comprising:
generating, via the software application, a graphical user interface (GUI) comprising interactive simulations corresponding to the interactive posters and respective user selections made thereon.

14. A system comprising:
one or more interactive posters, each comprising one or more regions configured to allow a user to make one or more user selections;
computer readable media storing a software application executed by a first mobile computing device associated with the user, the first mobile computing device configured to communicate with:
i) a server, over a first communication link; and
ii) the one or more interactive posters, over one or more respective second communication links;
wherein the software application is configured to communicate with the server and includes instructions that, when executed by at least one processor, cause the first mobile computing device to perform operations comprising:

receiving, by the first mobile computing device, via the one or more second communication links, at least one user selection made by the user on the one or more interactive posters;
transmitting, by the first mobile computing device, the user interaction data to the server; and
receiving, by the first mobile computing device, from the server, content data related to one or more of the user interaction data, the one or more interactive posters, and the user;
wherein the content data has been generated by the server based at least in part on one or more of the user interaction data, the one or more interactive posters, and the user; and
generating, by the first mobile computing device, a graphical user interface (GUI), the GUI comprising one or both of:
i) one or more user-personalized interactive simulations corresponding to each respective poster of the one or more interactive posters, and
ii) at least a portion of the content data.

15. The system of claim 14, wherein the software application further includes instructions that, when executed by the at least one processor, cause the first mobile computing device to perform operations comprising:
tracking, via the first mobile computing device, in real time, based on the at least one user selection, a user interaction experience of the user while the user interacts with the one or more interactive posters to form user interaction data;
wherein the content data comprises one or more statistics of one or more selection made by at least one other user on the one or more interactive posters; and
wherein the one or more selection made by at least one other user is related to one or more user selections made by the user.

16. The system of claim 14, wherein the software application may be implemented via at least one of a model-view-controller (MVC) framework and/or MVC subcomponents.

17. The system of claim 14, wherein the software application further includes instructions that, when executed by the at least one processor, cause the first mobile computing device to perform operations comprising:
processing instructions regarding the one or more interactive posters by handling the interactive posters as Bluetooth low energy (BLE) peripherals.

18. The system of claim 14, wherein at least one of the one or more interactive posters comprises a composite structure having a foundation substrate layer and a touch-activated electronically-coded interactive display imagery, comprising conductive ink.

19. The system of claim 14, wherein the software application further includes instructions that, when executed by the at least one processor, cause the first mobile computing device to perform operations comprising two or more of:
providing, via the first mobile computing device, additional statistics regarding a plurality of individuals other than the user who have interacted with the one or more interactive posters;
providing, via the first mobile computing device interactive GUI functionality that enables the user to update or change the touch selections that the user made when interacting with the interactive posters;
providing, via the first mobile computing device, additional information to the user regarding subject matter related to the one or more interactive posters.

20. The system of claim 14, wherein the software application further includes instructions that, when executed by the at least one processor, cause the first mobile computing device to perform operations comprising:
- tracking, in real time touch selection data regarding touch interactions made by individuals in geographically-separate interactive poster installations; and
- providing, via the first mobile computing device, the touch selection data in real time to the user.

* * * * *